Oct. 17, 1950 A. A. KIRKPATRICK 2,525,805
TOOL SLIDE
Filed Oct. 1, 1948

Inventor:
Arlo A. Kirkpatrick
By Edward C. Fitzhugh
Atty.

Patented Oct. 17, 1950

2,525,805

UNITED STATES PATENT OFFICE 2,525,805

TOOL SLIDE

Arlo A. Kirkpatrick, Muncie, Ind., assignor to Borg-Warner Corporation, Chicago, Ill., a corporation of Illinois Application October 1, 1948, Serial No. 52,163

4 Claims. (Cl. 77—32)

This invention relates to tool-feeding mechanism for use with boring machines and the like.

Machines, such as automatic turret lathes, designed to perform cutting operations, such as, drilling, boring, facing, turning, reaming, grooving or threading, on workpieces, usually employ a tool-supporting slide movable toward a rotating workpiece to engage the cutting tool, carried by the slide, with the workpiece to perform one of the above cutting operations thereon. The standard tool slide is movable a fixed predetermined distance toward the workpiece by feeding mechanism of the machine conventionally employed for this purpose and controlling the extent and limit of travel of the machine slide.

The present invention is directed to the provision of a tool-feeding device for machines, such as described, and is particularly adapted to augment the normal travel of the cutting tool by the machine slide so that the travel of the cutting tool is substantially greater than the amount of travel of the standard machine slide by the feeding mechanism of the machine.

Another object of the invention is to provide a tool-feeding device for machines, such as described, and having relatively movable members, one of the members being secured to the tool-supporting slide of the machine and another member to the cutting tool, these members being relatively movable, upon travel of the slide, by mechanism of the attachment to cause the travel of the tool to exceed the travel of the slide.

A further object of the invention is to provide a tool-feeding device as described, wherein an adjustable stop is provided for arresting relative movement of the members secured to the machine slide and tool, upon the tool reaching the workpiece, the members thereupon moving as a unit to forcibly feed the tool into the workpiece.

Additional objects and advantages of the improvement contemplated herein will be apparent to persons skilled in the art after the construction and operation of the machine tool feed device is understood from the following description, with reference being made to the accompanying drawing, wherein.

Figure 1:
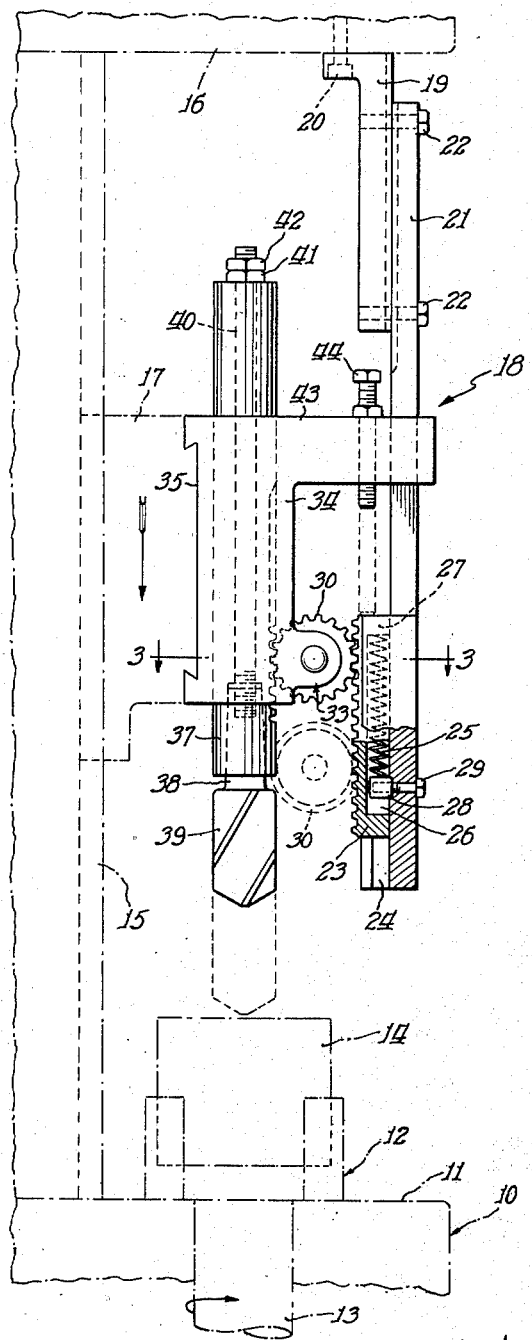
Fig. 1 is a side elevational view, partly in section, of the tool-feeding device of the present invention embodied in a vertical turret lathe.
Figure 2:
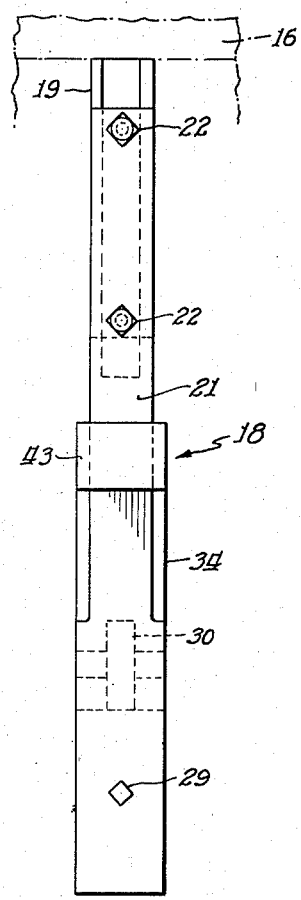
Fig. 2 is a front elevational view of the device shown in Fig. 1.

The machine chosen to illustrate the embodiment of the invention is well-known to persons skilled in the art as an automatic vertical turret lathe adapted to control a cutting tool and workpiece for the performance of boring, facing, drilling, turning, reaming, grooving, or threading of the workpiece by the cutting tool, and for this reason, the machine has been only fragmentarily shown in the drawing. Referring to the drawing, the lathe comprises a carrier or turret 10 having a horizontal surface 11 supporting a chuck 12. The chuck 12 has secured thereto a spindle 13 rotatably mounted in the carrier 10 for revolving the chuck 12 and a workpiece 14 mounted in the chuck 12. A column 15 of the machine extends upwardly of the carrier 10 and merges with a housing 16, the column 15 and housing 16 containing mechanism (not shown) for controlling vertical feeding and return movement of a tool-supporting slide 17 to and from the workpiece 14, the slide being movably mounted on the adjacent side wall of the column.

The tool-feeding attachment of the invention is indicated at 18 and comprises an elongated mounting member or bar 19 having one end thereof fixed by a bolt 20 to the stationary housing 16 of the machine, a guide rod 21 is fixed to one side of the bar 19 by bolts 22, 22 and is provided with a longitudinally extending groove receiving a rack 23 and comprising a portion of a dovetail connection 24 between the bar 21 and rack 23 for slidably mounting the rack 23 in the bar 21. The rack is supported on a compression spring 25 received within a longitudinally extending slot 26 in the rack. The top end of the spring 25 engages an end wall 27 of the rack, defining the upper terminals of the slot 26 in the rack, and the bottom end of the spring is seated on a nut 28 fixed to the bar 21 by a bolt 29 extending through an opening in the bar 21 and engaging the nut 28. It may be noted from a consideration of Fig. 1 that the rack may be moved downwardly against the compression of the spring.

The rack 23 has teeth meshing with teeth of a pinion 30 rotatably mounted on a pinion shaft fixed to the spaced walls 31 and 32 of a bracket 33 integral with and provided at the lower end of one side of a carrier 34, the carrier having a horizontally extending groove in its opposite side and forming a portion of a dovetail joint 35 connecting the carrier 34 and tool slide 17. The carrier 34 and pinion 30 are thus compelled to move with the tool slide 17 during vertical movement thereof and the carrier 34 may be said to form a portion thereof.

Figure 3:
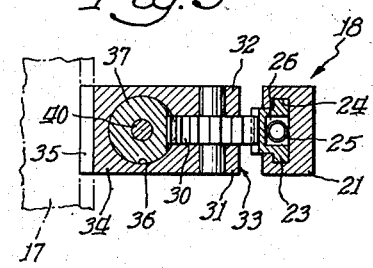
Fig. 3 is a transverse sectional view of the device, the section being taken substantially along the line 3—3 of Fig. 1.

As shown in Fig. 3, the carrier 34 is provided with a cylindrical opening 36 extending longitudinally therethrough and guidingly receiving a tool holder or rack 37 having teeth in engagement with teeth on the pinion 30 which extend within the opening 36 in the carrier 34, as shown in Fig. 3. The rack 37 extends through the carrier 34 and is in the form of a tube, with the lower end of the tube having a tapered inner diameter for receiving the frusto-conical shank 38 of a tool or drill 39. The drill 39 is fixed to the rack 37 by a shaft 40 extending through the tubular rack and having its lower end threaded into the shank 38 of the drill and its upper end threaded into bolts 41 and 42, the bolt 41 abutting the upper end of the carrier and serving, through the medium of the shaft 40, to maintain the drill 39 fixed to the carrier 34, and the nut 42 being used to lock the nut 41 against relative movement. As described hereinafter, the rack 37 is movable in a vertical direction relative to the carrier 34 and tool slide 17, during movement of the carrier 34 and slide 17 in the same direction, to feed the drill 39 toward the workpiece 14 and to return the drill to its normal position shown in the drawing.

The carrier 34 is provided at its upper extremity with a lateral extension 43 having a rectangular opening therein receiving the bar 21 to guide the vertical movement of the carrier. The extension 43 of the carrier supports an adjustable stop member in the form of a bolt 44 threaded in the extension 43 for a purpose to be described.

For the purpose of explaining the advantages of my novel tool-feeding device, it may be noted that standard machines, such as the turret lathe described for performing cutting operations, conventionally employs a machine tool slide having a predetermined and fixed limit of maximum travel whereby the machine tool slide is movable with a tool, such as a drill, which can be given a stroke limited to eight (8) inches, for example. In many instances, it is not only desirable but necessary to move the drill toward the work-piece a greater distance than permitted by the maximum travel of the tool slide. The device of the present invention is designed to augment the normal maximum travel of the tool slide and thereby the tool by compounding the travel of the tool with respect to the travel of the machine tool slide, so that, even though the travel of the standard machine tool slide is limited to eight (8) inches, for example, the device is effective to give a twelve (12) inch stroke to the tool.

In the operation of the tool feeding device 18, initially the spring 25 will maintain the rack 23 fully elevated and the tool 39 will assume an elevated supported position relative to the workpiece 14. Initial downward movement of the slide 17 and consequently of the carrier 34 serves to gradually lower the pivotal axis of the pinion 30 and cause the pinion to rotate in a counter-clockwise direction and feed the rack 37 and tool 39 downwardly at an increased rate of movement relative to the rate of downward movement of the slide 17, the speed of downward movement of the tool 39 being twice the speed of downward movement of the slide 17. During said downward and rotational movement of the pinion 30, the rack 23 performs the function of a reaction member which forms the basis for the rotational movement of the pinion 30, and for the downward feeding of the tool holder or rack 37, and consequently of the tool 39.

Upon engagement of the workpiece 14 by the end of the tool 39, further downward movement of the tool 39 is, of course interrupted and, as the slide 17 continues to descend, the pinion 30 will move or walk downwardly on the stationary rack 37 and thus rotate in a clockwise direction and force the rack 23 downwardly against the action of the spring 25 which becomes compressed progressively thus forcing the rotating tool against the workpiece with gradually increasing pressure to perform operative work thereon.

Depending upon the character of the workpiece 14, i. e., its relative hardness or resistance to the cutting action of the tool 39, the pressure of the spring 25 may or may not be sufficient to feed the tool downwardly to the workpiece at a rate equal to or in excess of the downward rate of travel of the slide 17. If the workpiece 14 is of a resistant nature, the continued downward movement of the carrier will ultimately cause the lower end of the bolt 44 to engage the upper end of the rack 23 whereupon the racks 23 and 37 and the pinion 30 form a locked structure and the extended tool 39 is positively fed downwardly into the work by the slide 17 at the same rate of speed as the latter.

Upon completion of the drilling operation on the workpiece, the tool slide 17 will be moved to its normal position in Fig. 1 and will simultaneously cause the rack 37 and drill 39 to be retracted from the workpiece to the positions shown in Fig. 1 by the action of the pinion 30 and rack 23 on the rack 37.

It will thus be apparent that I have invented a tool-feeding device for machines for boring, turning, reaming, etc., such as turret lathes and the like, wherein the normal maximum travel of a machine tool provided by a machine tool slide is considerably increased.

I am aware that many changes may be made and numerous details of construction may be varied through a wide range without departing from the principles of this invention, and I, therefore, do not propose limiting the patent granted hereon otherwise than necessitated by the prior art.

1. In a cutting machine, a member for holding a workpiece, a slide movable toward said workpiece, a tool holder adapted to contain a cutting tool slidably disposed within said slide for axial movement toward and away from the workpiece, a stationary guide rod, a toothed rack slidably disposed on said guide rod, a series of rack teeth on said tool holder, a pinion mounted on said slide and movable bodily therewith and meshing with the teeth on said holder and with the teeth on said rack, a stop on said guide bar limiting the movement of said rack on said guide rod, and yieldable means normally urging said rack toward its limiting position.

2. In a cutting machine, a member for holding a workpiece, a slide movable toward said workpiece, a tool holder adapted to contain a cutting tool slidably disposed within said slide for axial movement toward and away from the workpiece, a stationary guide rod, a toothed rack slidably disposed on said guide rod, a series of rack teeth on said tool holder, a pinion mounted on said slide and movable bodily therewith and meshing with the teeth on said holder and with the teeth on said rack, means limiting the movement of said rack on said guide rod in one direction whereby said rack, operating as a reaction member, will cause said pinion to feed the tool holder toward the workpiece during movement of the slide toward the workpiece at a rate of movement equal to twice the rate of movement of the slide, and yieldable means normally urging said rack toward its limiting position and adapted, when the tool engages the workpiece, to yield and cause the pinion to move the tool holder and force the tool against the workpiece.

3. In a cutting machine, a member for holding a workpiece, a slide movable toward said workpiece, a tool holder adapted to contain a cutting tool slidably disposed within said slide for axial movement toward and away from the workpiece, a stationary guide rod, a toothed rack slidably disposed on said guide rod, a series of rack teeth on said tool holder, a pinion mounted on said slide and movable bodily therewith and meshing with the teeth on said holder and with the teeth on said rack, means limiting the movement of said rack on said guide rod in one direction whereby said rack, operating as a reaction member, will cause said pinion to feed the tool holder toward the workpiece during movement of the slide toward the workpiece at a rate of movement equal to twice the rate of movement of the slide, yieldable means normally urging said rack toward its limiting position and adapted, when the tool engages the work to yield and cause the pinion to move the tool holder and force the tool against the workpiece with increasing pressure, and an abutment on said slide adapted to engage said rack at a predetermined position of the slide in its movement toward said workpiece to lock the tool holder, pinion and rack against relative movement whereby the tool holder and tool will move toward the work at the same rate of movement as that of the slide.

4. In a cutting machine, a member for holding a workpiece, a slide movable toward said workpiece, a tool holder adapted to contain a cutting tool slidably disposed within said slide for axial movement toward and away from the workpiece, a stationary guide rod, a toothed rack slidably disposed on said guide rod, a series of rack teeth on said tool holder, a pinion mounted on said slide and movable bodily therewith and meshing with the teeth on said holder and with the teeth on said rack, means limiting the movement of said rack on said guide rod in one direction whereby said rack, operating as a reaction member, will cause said pinion to feed the tool holder toward the workpiece during movement of the slide toward the workpiece at a rate of movement equal to twice the rate of movement of the slide, a stop on said guide rod, a compression spring bearing against said stop and urging said rack toward its limiting position and adapted, when the tool engages the work piece, to yield and cause the pinion to move the tool holder and force the tool against the workpiece with increasing pressure.

ARLO A. KIRKPATRICK.

REFERENCES CITED

The following references are of record in the file of this patent:

UNITED STATES PATENTS

| Number | Name | Date |
| --- | --- | --- |
| 1,522,124 | Hoisington | Jan. 6, 1925 |